UNITED STATES PATENT OFFICE.

JACOB MÜLLER, OF NEWARK, NEW JERSEY.

IMPROVEMENT IN COMPOSITIONS FOR COATING THE OUTSIDE OF BUILDINGS.

Specification forming part of Letters Patent No. 119,167, dated September 19, 1871.

*To all whom it may concern:*

Be it known that I, JACOB MÜLLER, of Newark, in the county of Essex and State of New Jersey, have invented a new and Improved Compound for Outside Coating of Buildings; and I do hereby declare the following to be a full, clear, and exact description thereof, which will enable those skilled in the art to make and use the same.

This invention relates to a compound of cement, sand, sulphate of iron, and suitable coloring matter mixed together in such a manner that when the same is applied to the outside of a building it forms a good and durable protection, and it can be molded in any desired form.

In carrying out my invention I take the above-named ingredients in about the following proportions: Cement, two buckets; sand, five buckets; sulphate of iron, about a quarter pound. Lime may be added, and coloring matter to suit. These ingredients are intimately mixed, and just before the compound is to be used it is formed into a plastic mass ready to be thrown on the building to be coated.

By the addition of sulphate of iron to the cement and sand my compound is rendered hard and indestructible, and by incorporating the coloring matter with the compound a coating is obtained which retains its colors and which requires no repainting.

My compound can be readily molded into any desired form, and when properly applied it imparts to a building an ornamental appearance; and, being capable of resisting all influence of the weather or temperature, it forms a safe and durable protection for the building to which it has been applied.

What I claim as new, and desire to secure by Letters Patent, is—

A compound for the outside coating of buildings, made as herein described.

JACOB MÜLLER.

Witnesses:
A. FABER DU FAUR,
E. F. KASTENHUBER. (92.)